Feb. 20, 1934.                W. H. RADFORD                 1,947,797
                                 FILLER CAP
                         Original Filed Feb. 10, 1930
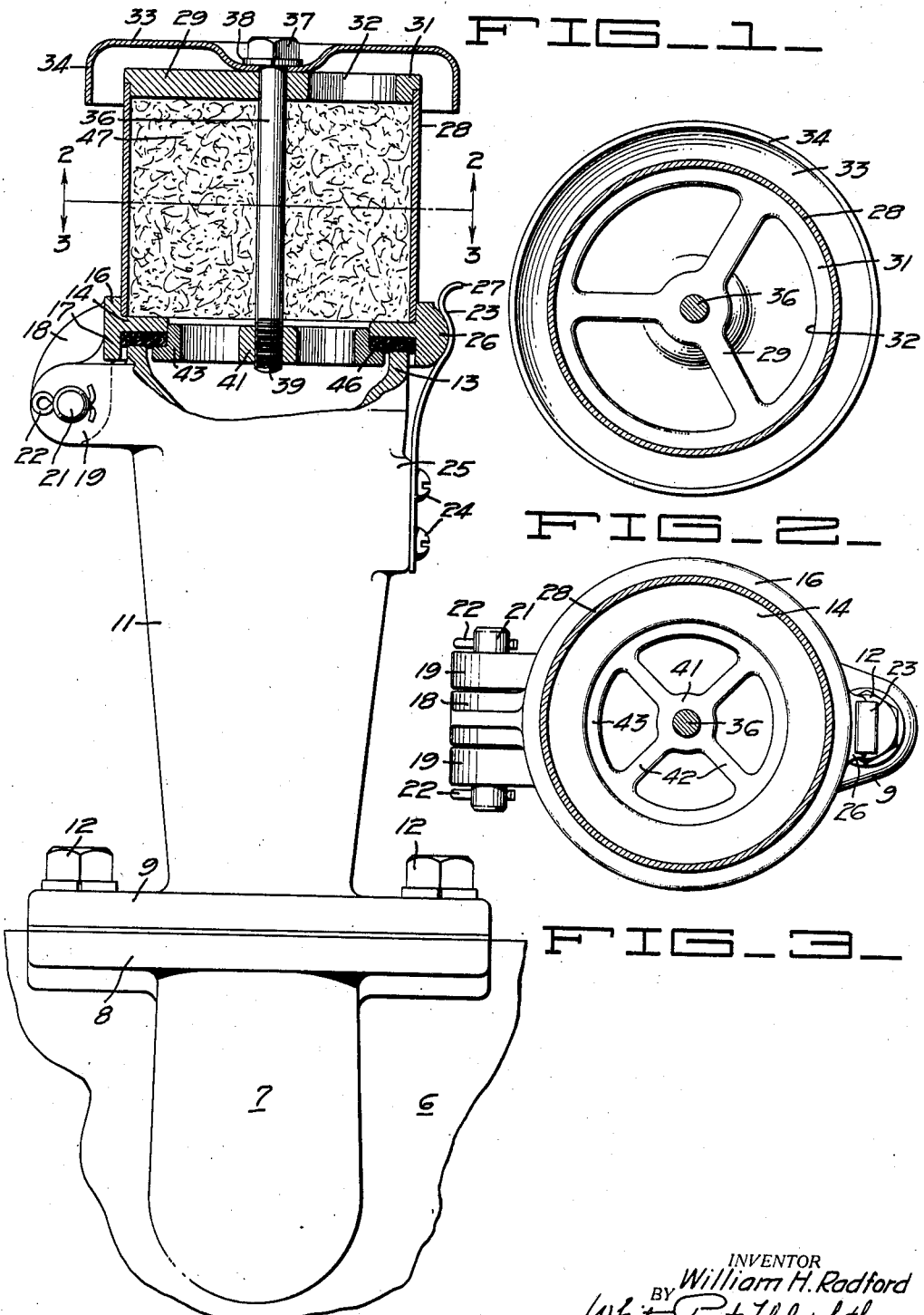
INVENTOR
BY *William H. Radford*
White, Prost, Fisher Lothrop
ATTORNEYS Patented Feb. 20, 1934

1,947,797

UNITED STATES PATENT OFFICE 1,947,797

FILLER CAP

William H. Radford, Peoria, Ill., assignor to Caterpillar Tractor Co., San Leandro, Calif., a corporation of California Application February 10, 1930, Serial No. 427,390
Renewed August 31, 1932

7 Claims. (Cl. 183—49)

My invention relates to devices adapted to be used in connection with currents, such as air currents, laden with undesired material. In one embodiment, the device of my invention is especially adaptable to a filler spout connected to the crank case of an internal combustion engine and is herein disclosed in that environment. In most internal combustion engines there is a continual surging of air and vapors between the inside and outside of the crank case during the operation of the engine. Air currents from the inside of the crank case usually are laden with oil vapors while air currents passing from the atmosphere into the crank case are often laden with dust particles and other deleterious matter which it is desirable to keep out of the crank case.

An object of my invention, therefore, is to provide an attachment for a filler spout which is capable not only of confining the oily vapors to the crank case but also is capable of excluding dust and similar foreign material.

Another object of my invention is to provide a filler cap which can be applied to an ordinary filler spout to convert the filler spout into a crank case breather.

A further object of my invention is to provide a filler cap which is easily constructed and assembled.

Another object of my invention is to provide for easy renewal of the filtering material employed.

Another object of my invention is to provide for attachment to a standard filler spout of a filler cap which will afford easy access to the spout, for instance, when the engine crank case is to be filled with oil.

The foregoing and other objects are attained in the embodiment of the invention shown in the drawing, in which Fig. 1 is a side elevation of a filler spout with the filler cap of my invention attached thereto, the cap being shown in diametral cross section on a vertical plane.

Fig. 2 is a cross section on the line 2—2 of Fig. 1.

Fig. 3 is a cross section on the line 3—3 of Fig. 1.

In its preferred form, the filler cap of my invention comprises a container filled with filtering material which is adapted to be secured to a standard filler spout and to be moved from a position covering the spout to another position uncovering the spout.

Since I preferably apply the filler cap of my invention to internal combustion engines, I have so illustrated it in the drawing. As shown in Fig. 1, the crank case 6 of the engine is formed with a filler boss 7 which is hollow and which communicates with the interior of the crankcase. The boss is preferably formed with an apertured flange 8 for the reception of a complementary flange 9 at the lower end of a filler spout 11. This spout is secured to the crank case by studs 12 piercing the flanges 8 and 9. The spout is preferably upwardly flared and is a hollow conical body terminating in an annular lip 13. During the operation of the engine, atmospheric air is inducted into the crankcase 6 and oily vapors are expelled therefrom usually alternately and in rapidly recurring cycles, causing a material flow through the spout.

To prevent the ingress of dust laden air to the crank case and the egress of oily vapors therefrom, I provide the filler cap of my invention. This cap preferably includes a lower head 14 of annular contour provided with an upwardly extending flange 16 and a depending flange 17 of substantially the same interior bore. To secure the head 14 to the spout 11 so that it cannot be misplaced, I preferably provide a tongue 18 extending from the head 14 and interfitting with a pair of ears 19 projecting from and usually formed integrally with the spout 11. A pin 21 pierces the aligned tongue and ears and is retained by cotter pins 22. There is thus afforded a hinged connection between the head 14 and the spout 11 so that the head can be moved from a position covering the spout to another position uncovering the spout.

So that the head can be releasably held in a position covering the spout, I provide a latch mechanism such as the spring finger 23 secured at its lower end by a pair of screws 24 to a boss 25 formed on the spout 11. At its upper end, the finger is curved to overlie a boss 26 formed integrally with the head 14 and to provide a convenient projection 27 for manipulation. Seated on the head 14 is a cylindrical spacer 28 which, at its upper end, carries a second head 29. This head 29 is provided with a peripheral flange 31 and is pierced by a plurality of apertures 32 affording access to the atmosphere from the spout 11. Abutting the upper head 31 is a shield 33 provided with a peripheral depending skirt 34 which encompasses the upper portion of the spacer 28.

In order to hold the heads 14 and 29 and the spacer 28 together as a unit, I provide means such as a stud or screw 36 passing through the assembly. The stud is formed with a head 37 against which a lock washer 38 is situated, and at its lower end is threaded as at 39 to engage a threaded central aperture in a spider 41. The spider includes a plurality of radial arms 42 connecting the central hub of the spider with an annular flanged portion 43 which is nested within the head 14. An annular gasket 46 is retained by the flanged spider in position between the head 14 and the lip 13 of spout 11. The unitary securing member 36 is thus effective not only to hold the shield 33 and the head 29 in abutment with the spacer 28 but also to hold the spider 41, the gasket 46 and the head 14 in abutment with the spacer 28 to provide a filtering unit.

To render this unit effective as a filter, I preferably fill the container formed by the spacer 28 and the two heads 14 and 29 with a filtering material 47. The filtering material is customarily moss or a similar pervious body preferably comprising a large number of fibrous structures matted or felted together so that there is a relatively free air passage therethrough but so that extraneous particles and undesired materials are entrained or caught.

When fumes from the crankcase 6 pass outwardly through the spout 11 and through the filter unit, any oily vapors which they contain are condensed and entrapped in the filtering material 47 providing a wetted surface. Such oily vapors are thus prevented from escaping to the atmosphere in an undesirable manner, and, furthermore, a subsequent incoming surge of atmospheric air through the filter unit into the crankcase 6 is deprived of foreign material, such as dust particles, by the entraining action of the filtering material 47 which is enhanced by the oily or wetted surface of the plurality of fibers making up the filtering material.

Ordinarily the filter unit is in a position as shown in Fig. 1 to close the opening through the spout 11, but by releasing the latch 23 the entire filter unit can be moved about its hinge connection affording a free opening into the filler spout for the introduction of oil, for instance, into the crankcase 6. The filter unit being attached to the spout is not easily misplaced or lost. However, it can easily be removed therefrom by extraction of pin 21 and further disassembled simply by the withdrawal of stud 36 either for the renewal of the filtering material 47 or for inspection and cleaning. The assembly is of simple nature and is economical to manufacture and can be added to a standard filler spout such as the one shown in the drawing with a minimum of expense and effort.

It is to be understood that I do not limit myself to the form of the filler cap shown and described herein, as the invention, as set forth in the following claims may be embodied in a plurality of forms.

By the term "base portion" employed in some of the claims, is meant the under part of the filter unit which is adjacent the filler spout and provides the cover for the end of the spacer adjacent said spout.

I claim:

1. A filler cap for a filler spout comprising a flanged annular head, a gasket interposed between said head and said spout, a flanged spider seated on said gasket, a cylindrical spacer seated on said head, a second flanged head having apertures therein and engaging said spacer, a shield overlying said apertures, filtering material within said spacer, and a stud engaging said shield and said spider for holding said heads in abutment with said spacer.

2. A filler cap for a filler spout having an annular lip comprising a flanged annular head, a gasket interposed between said head and said lip, a flanged spider nested within said head and overlying said gasket, a cylindrical spacer seated on said head, a second flanged head having apertures therein and engaging said spacer, a shield overlying said apertures, a skirt on said shield encompassing said spacer, a stud engaging said shield and said spider for holding said heads in abutment with said spacer, and filtering material within said spacer.

3. A filler cap for a filler spout comprising a base portion to lie over the spout, a tubular spacer seated on said base portion, a head having an aperture therein and engaging the spacer, a shield overlying the apertured head, filtering material within the spacer, and a member engaging said shield and said base portion for holding said head and base portions in abutment with said spacer.

4. A fitting for an oil filler of an engine crankcase comprising spaced covering means having apertures therein for entrance and exit of the fluid passing therethrough to be filtered, a tubular spacer between said covering means providing an outer casing, filtering material in said spacer between said covering means for filtering the fluid, a shield adjacent one of said covering means for preventing entry of large particles of deleterious matter with the fluid, the central portion of said shield engaging said one of said covering means, and means for detachably connecting said shield, said covering means, and said tube as a unitary assembly including a member passing therethrough.

5. A fitting for an oil filler of an engine crankcase comprising a base portion, a tubular spacer having one end fitting within said base portion, a top member having a portion fitting within said spacer at the other end thereof, filtering material within said spacer, and unitary means for detachably securing said base portion, said spacer, and said top member together as a unit.

6. A fitting for an oil filler of an engine crankcase comprising a base portion, said base portion having a central threaded aperture, a tubular spacer having one end fitting within said base portion, a top member having a portion fitting within said spacer at the other end thereof, filtering material within said spacer, and unitary means for detachably securing said base portion, said spacer, and said top member together as a unit, comprising a screw extending through said base, said spacer, and said top member and having threaded engagement with said central threaded aperture of said base portion.

7. A fitting for an oil filler of an engine crankcase comprising a head member, a base portion spaced from said member, said portion and said member having apertures therein for entrance and exit of the fluid passing therethrough to be filtered, a tubular spacer between said head member and said base portion providing an outer casing, filtering material in said spacer between said heads for filtering the fluid, a shield adjacent said head member for preventing entry of large particles of deleterious matter with the fluid, and having the central portion thereof engaging said head, and means for detachably connecting said shield, said head member, said tube and said base portion as a unitary assembly comprising a screw having its head disposed in said central portion of said shield, said screw passing through said head, and said spacer, and having threaded engagement with said base portion.

WILLIAM H. RADFORD.